May 22, 1934.  O. L. WESTGATE  1,959,974
ACCESSORY FOR AUTOMOBILES
Filed Dec. 12, 1932   2 Sheets-Sheet 1

Inventor
OSCAR L. WESTGATE
By Ralph B. Stewart
Attorney

May 22, 1934.  O. L. WESTGATE  1,959,974
ACCESSORY FOR AUTOMOBILES
Filed Dec. 12, 1932  2 Sheets-Sheet 2
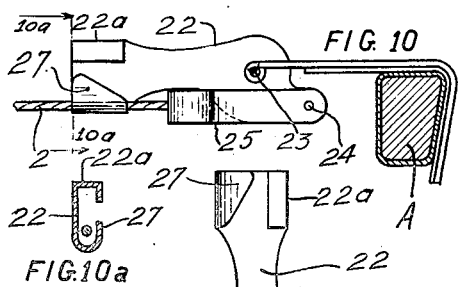
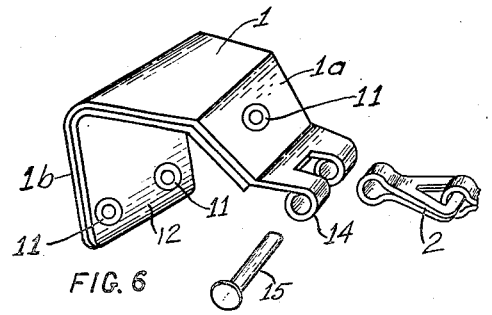
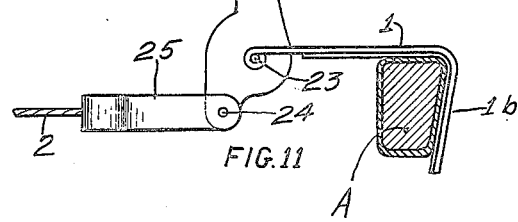
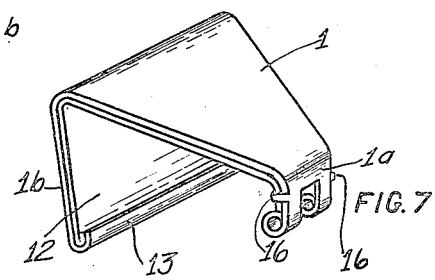
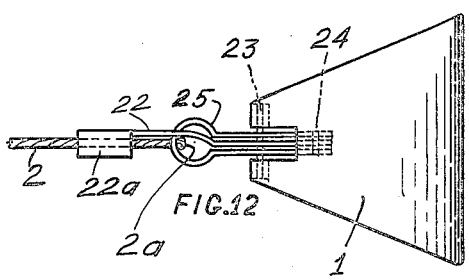
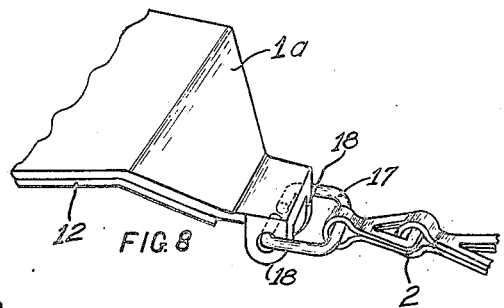
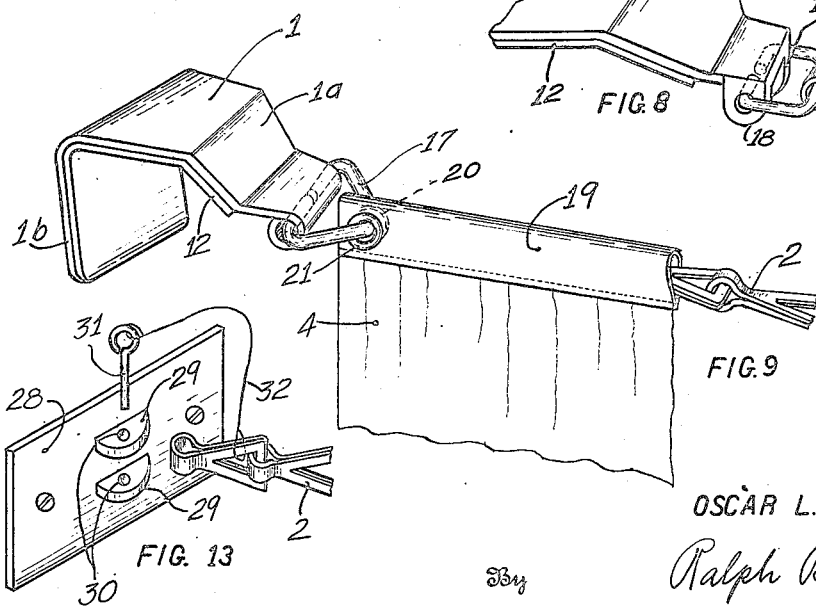
Inventor
OSCAR L. WESTGATE
By Ralph B. Stewart
Attorney Patented May 22, 1934

1,959,974

UNITED STATES PATENT OFFICE 1,959,974

ACCESSORY FOR AUTOMOBILES

Oscar L. Westgate, Rochester, N. Y.

Application December 12, 1932, Serial No. 646,931

8 Claims. (Cl. 5—94)

My invention relates to an accessory for automobiles.

An object of my invention is to provide a device which cooperates with the seat of an automobile to form an enclosure which may be used as a bed or crib for a child or as a receptacle for carrying articles.

Another object of my invention is to provide a device for converting an automobile seat into a carrier or receptacle in which the automobile seat or cushion itself serves to support substantially the entire weight of the contents of the carrier, thereby obtaining full benefit of the easy riding qualities of the cushioned seat.

A further object is to devise a carrier of the kind described which may be easily and quickly attached to and removed from the vehicle without altering or damaging the vehicle in any way.

It is also an object of my invention to provide a protecting covering for the automobile seat.

In the devices in use at the present time for carrying small children in automobiles, the child is confined to a small bed or crib and it is not possible for the child to move about freely. According to my invention I overcome this disadvantage by utilizing the space of a seat and at the same time making use of the cushioned area of the seat thereby providing a desirable place for a child to play or sleep.

My invention is illustrated in the accompanying drawings in which:

Figures 6, 7, 8 and 9 show other forms of detachable anchoring hooks for use with my invention;

Figure 10 shows tensioning means for the cable supporting the cloth across the front of the seat;

Figure 10a is a vertical cross-section of the tensioning means in locked position as shown in Fig. 10 along line 10a—10a;

Figure 11 shows the tensioning means in the open or unlocked position;

Figure 12 is a plan view of Figure 10;

Figure 13 shows another type of anchor in the form of a plate which may be secured to the sides of the automobile body.

Figure 1:
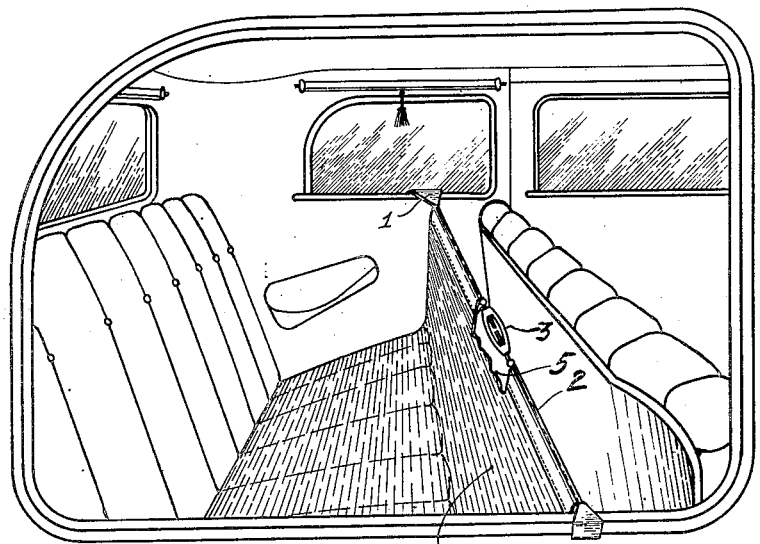
Figure 1 is a perspective view of one form of my invention applied to the rear seat of an automobile, as seen through the right rear window of the car.
Figure 4:
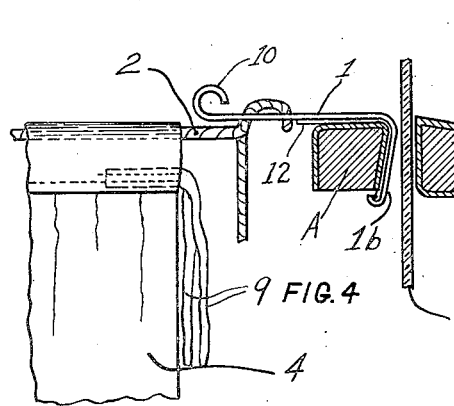
Figure 4 shows one way in which my invention may be attached to the automobile.

Referring to the drawings, two metallic hooks 1 engage the inner sills of the two rear windows of the vehicle, as shown in Figs. 1 and 4. A flexible member 2, such as a cable, rope or chain is attached to the hooks and supports a fabric material 4 by passing through a hem formed along the upper edge of the sheet 4. The material 4 is shown cut away at 5 to illustrate a turnbuckle 3 or any other suitable device inserted in the cable 2 for keeping the cable under tension. The turnbuckle 3 is located within the hem of the sheet 4 and may be operated by twisting the hem, or a part of the hem opposite the turnbuckle may be left unstitched to permit direct access to the turnbuckle. If desired, the unstitched part of the hem may be closed by a snap fastener. A section of the fabric material hangs from the cable to the top of the seat cushion 6; another section is laid in surface contact with the seat, and the end section is held by frictional contact between the seat cushion 6 and the back cushion 7. If desired, the end section may be made long enough to be folded back under the seat cushion to increase the holding friction.

Figures 2, 3:
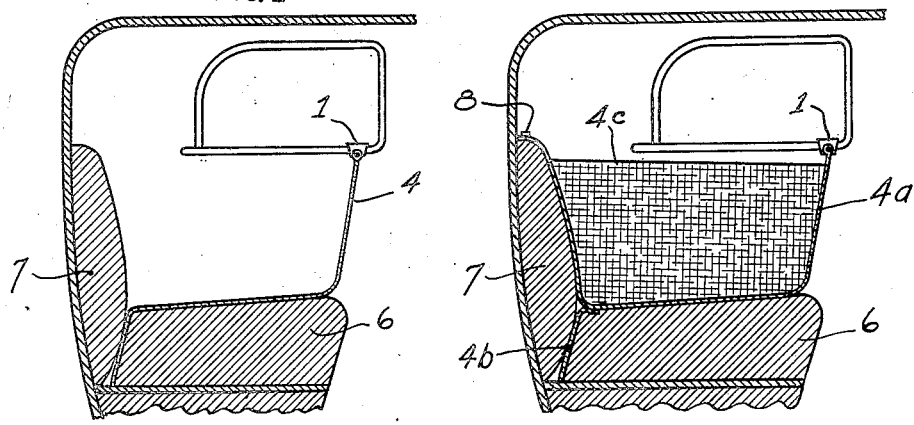
Figure 2 is a vertical cross-section of the rear part of Figure 1.
Figure 3 is a view like Fig. 2 showing a second modification of my invention.

A modified form of my invention is shown in Fig. 3 in which a box-like fabric structure is provided to protect the upholstery of the sides and back as well as protecting the seat cushion. The fabric 4a is supported across the front of the seat as explained above in connection with Figs. 1 and 2, but the end section passes up over the back cushion and is held in position by any suitable hook, tape or snap fasteners 8 on the top of the bask cushion structure or on the body of the car itself. Side panels 4c, of which only one is shown, are stitched to the main fabric 4a, thus forming a box-like structure and serving to protect the upholstery on the sides of the car. A "flap" 4b may be stitched to the fabric 4a on the lower back side and held by frictional engagement between the seat cushion 6 and the back cushion 7. In both forms of my invention, the fabric material may be waterproofed to protect the upholstery.

Figure 5:
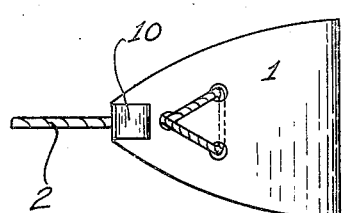
Figure 5 is a plan view of the hook device of Fig. 4.

In Fig. 4 is shown one method of preventing the fabric from sliding along the cable away from the hooks. For this purpose the strings 9 may be stitched to the fabric and tied in the loop 10 of the hook 1. The ends of cable 2 are adjustably secured to the hooks 1 by frictional engagement with three holes formed in the hooks; the manner of threading the cable through the holes being clearly shown in Figs. 4 and 5. From Fig. 4 it will be seen that the lip portion 1b of the hook 1 engages the inner window sill by passing down in the space between the inner sill A and the window glass B.

In Fig. 6 is shown a hook designed for use with a flexible chain. In this arrangement a pin or rivet 15 is inserted in the loops 14 and passes through the chain link to provide a positive connection therebetween. The rivets (hollow rivets or eyelets) 11 secure a felt or leather pad 12 on the inner surfaces of the hook, to prevent scratching of the paint on the sill. The depending section 1a of the hook lowers the center of pull of the cable and prevents the hook from rising off of the sill when the cable is put under tension.

In Fig. 7 the protecting pad 12 is held in position by the lips 13 turned back on the edge of the hook and by tabs 16.

In Fig. 8 the split link 17 connects the chain with the depending ears 18 of another form of hook 1.

In Fig. 9 two eyelets 20 and 21 are provided in opposite walls of the hem of sheet 4 near the end of the hem, and the split link 17 passes through these two eyelets and through the end of chain 2 located between the eyelets. This construction prevents the fabric from sliding towards the center of the chain.

As shown in Figs. 4 and 6, 7, 9 and 10, the lip portion 1b of the various forms of hooks is bent to form an angle with the horizontal portion slightly less than 90° in order to prevent the hook from rising off of the sill when under tension. The protecting pad 12 applied on the inner surfaces of the hook may be secured in position by first sand-blasting the metal hook or otherwise roughening the surface and then cementing the pad to the roughened surface. This method of attachment may be used alone, or it may be used to supplement the various forms of attachment described above.

In Fig. 10 is shown a preferred form of tensioning means which allows the device to be quickly and easily placed on or removed from the vehicle seat. The lever 22 is pivoted to the hook 1 by means of the pin 23. Pivoted on lever 22 by rivet 24 is a clevis 25. The cable 2 may be secured to the clevis by passing it through a hole in the closed end of the clevis and knotting the cable as at 2a. Tension on the cable 2 causes the lever 22 to tend to pivot about the pin 23 in a clockwise direction holding the lip 27 against the cable in locked position. The unlocked position of the tensioning device is shown in Fig. 11, while the locked position is shown in Figs. 10 and 12. An end view of the lever 22 is shown in Fig. 10a, where it will be seen that the outer end of the lever is provided with a flat projection 22a forming a convenient surface for pressing the end of the lever down. A turnbuckle may be used in conjunction with this device, or the turnbuckle may be omitted and the device used alone. In order to provide proper tension on the cable in locked position, the cable must be adjusted in length in unlocked position so that when the device is moved to locked position the cable will be properly tensioned by lever 22. The cable length may be adjusted either by a turnbuckle or by the arrangement shown in Figs. 4 and 5. Once the proper length is determined, the adjustment need not be disturbed to apply or remove the cable.

While I have disclosed above various forms of hooks for supporting the cable between opposite window sills, it is obvious that the cable may be supported in various ways between opposite sides of the automobile body. In Fig. 13 I have shown an anchor plate for attachment to the sides of the car, preferably just below the window sill, one on each side.

In this arrangement a plate 28 is provided with ears 29 forming a support for the chain. The pin 31 is run through the holes 30 and the end of the chain. A flexible member such as a string 32 or a small chain may be used to secure the pin 31 to the chain, thereby preventing loss of the pin.

While my invention is particularly useful in connection with automobiles, it may be adapted for use on davenports or upholstered chairs having seat structures like that of an automobile.

In either form of my invention, the flexible chain or cable 2 may be replaced by an extensible rigid rod with suitable means for attaching the ends to the sides of the car, but such an arrangement cannot be installed and removed, nor stored, with the same facility as an arrangement employing a flexible supporting member as shown.

From the foregoing it will be seen that my invention provides a carrier or receptacle wherein the contents are supported upon the cushioned area of an upholstered seat, and the arrangement is free from hard or rigid elements from which a child might receive injury.

To those skilled in the art it will be obvious that many variations in the details of my device may be made without departing from the spirit of the invention, and that the details shown and described are for the purpose of illustrating but not limiting the invention.

What I claim is:

1. In combination with an automobile having a rear seat, a horizontal supporting member suspended between the sides of the automobile above the front edge of the rear seat, and a flexible curtain like sheet suspended from said supporting member and extending vertically downward to the front edge of said seat and having a terminal portion spread upon and substantially covering said seat, thereby providing an elevated guard at the front of the seat and a seat protective covering.

2. In combination with an automobile having a seat formed of a back cushion and a seat cushion, a pair of hook elements engaging opposite window sills on said automobile above the front edge of said seat cushion, a flexible tension member connecting said hooks, a sheet of flexible material supported across and above the front of said seat upon said tension member and having a portion extending vertically downward to the front edge of said seat cushion and a terminal portion spread upon said seat cushion.

3. In combination with an automobile having a seat formed of a back cushion and a seat cushion, a pair of hook elements engaging opposite window sills on said automobile above the front edge of said seat cushion, a flexible tension member connecting said hooks, means for adjusting the length of said tension member to vary the tension thereof, a sheet of flexible material supported across and above the front of said seat upon said tension member and having a portion extending vertically downward to the front edge of said seat cushion and a terminal portion spread upon said seat cushion.

4. In combination with an automobile having a seat formed with a back cushion and a seat cushion, a horizontal supporting member between the sides of said seat above the front edge thereof, a box-like lining for said seat secured to said supporting member and to the top of said back cushion structure, a friction member secured to the lower back edge of said lining and extending between said back cushion and said seat cushion.

5. In combination with an automobile having a seat formed of a back cushion and a seat cushion, a pair of hook elements engaging opposite window sills on said automobile above the front edge of said seat cushion, a flexible tension member connecting said hooks, a sheet of flexible material supported across and above the front of said seat upon said tension member and having a portion extending vertically downward to the front edge of said seat cushion, a portion spread upon said seat cushion, and a terminal portion frictionally engaged between said seat cushion and said back cushion.

6. In combination with an automobile having a seat formed of a back cushion and a seat cushion, a pair of hook elements engaging opposite window sills on said automobile above the front edge of said seat cushion, a flexible tension member connecting said hooks, means for adjusting the length of said tension member to vary the tension thereof, a sheet of flexible material supported across and above the front of said seat upon said tension member and having a portion extending vertically downward to the front edge of said seat cushion, a portion spread upon said seat cushion, and a terminal portion frictionally engaged between said seat cushion and said back cushion.

7. A crib structure comprising the combination of a seat having a seat cushion, a back cushion, and two sides forming respectively the bottom and three sides of said crib, a horizontal supporting member suspended between said sides above the front edge of said seat cushion, and a sheet of flexible material suspended from said supporting member and extending vertically downward to the front edge of said seat cushion and having its terminal portion spread upon and substantially covering said seat cushion, thereby providing a fourth side for said crib and a protective covering for said seat cushion.

8. An accessory for converting an automobile seat into a carrying receptacle comprising a flexible sheet of fabric material having a width substantially equal to the width of the automobile body and a length substantially equal to the vertical distance from the window sill to the front edge of the seat cushion plus the distance from the front edge to the rear edge of said cushion, a flexible supporting member secured along one edge of said sheet and provided with means at each end for detachably securing the same to the sides of the automobile, and length adjusting means embodied in said supporting member for adjusting the tension thereof.

OSCAR L. WESTGATE.